April 29, 1930.  F. C. ANDERSEN ET AL  1,756,719

SASH PULLEY

Filed Aug. 22, 1927

Inventors
FRED C. ANDERSEN
CLARENCE P. BIRD

Attorneys

Patented Apr. 29, 1930

1,756,719

UNITED STATES PATENT OFFICE

FRED C. ANDERSEN AND CLARENCE P. BIRD, OF BAYPORT, MINNESOTA, ASSIGNORS, BY MESNE ASSIGNMENTS, TO ANDERSEN FOUNDRY COMPANY, OF BAYPORT, MINNESOTA, A CORPORATION OF MINNESOTA

SASH PULLEY

Application filed August 22, 1927. Serial No. 214,654.

This invention relates to new and useful improvements in sash pulleys, and an object of the invention is to provide means for closing the gap or opening usually provided in devices of this kind between the groove of the pulley and the facing plate to exclude the entrance of cold air at points above and below the pulley.

A further object of the invention is to provide a sash pulley comprising a housing having a facing plate integrally formed therewith and provided with a slot through which a portion of the pulley projects, a tongue being integrally formed with the facing plate at the lower end of the slot projecting into the groove of the pulley to substantially close the gap between the pulley and the facing plate and improve the appearance of the housing as well as exclude air, and a shoulder being formed on the housing above the pulley to aid in excluding cold air at that point.

Other objects of the invention will appear from the following description and accompanying drawings and will be pointed out in the annexed claim.

In the accompanying drawings there has been disclosed a structure designed to carry out the various objects of the invention, but it is to be understood that the invention is not confined to the exact features shown, as various changes may be made within the scope of the claim which follows.

In the accompanying drawings forming part of this specification,

Figure 1:
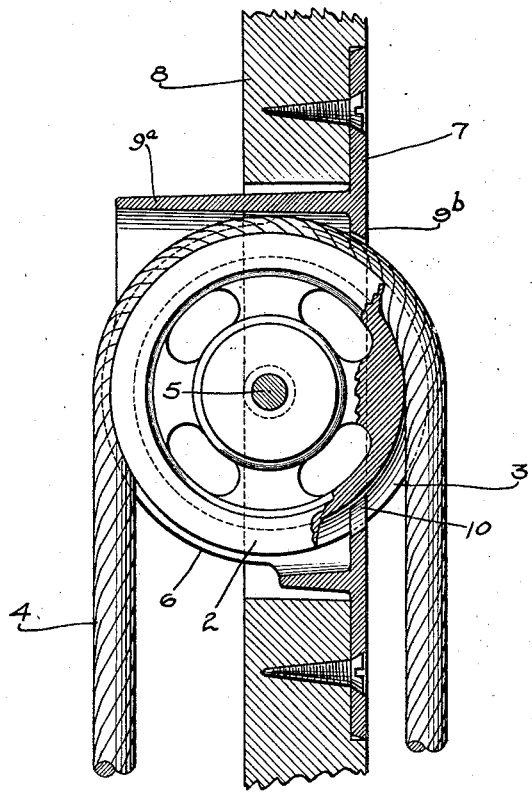
Figure 1 is a vertical sectional view showing a portion of a window frame jamb with the improved pulley mounted therein.

The novel sash pulley featured in this invention comprises the usual pulley 2, having a groove 3 therein adapted to receive the usual cord 4, as shown in Figure 1. The pulley is mounted on a shaft 5, having its end portions secured in the housing 6 by such means as riveting. (See Figure 2.)

A facing plate 7, adapted to be fitted against the inner face of the window jamb 8 as shown in Figure 1, is integrally formed with the housing 6, and has an elongated opening or slot 9 provided therein through which the pulley projects as shown.

An important feature of this invention resides in the means provided for substantially closing the gap usually provided between the lower portion of the pulley groove and the facing plate 7, when the device is mounted in the jamb 8 as shown in Figure 1, to exclude the entrance of air at this point. Such means consists of a tongue 10 integrally formed preferably with the facing plate 7 at the lower end of the opening or slot 9, which tongue is substantially alined with the slot so that when the pulley is mounted in the housing, the tongue will extend into the groove of the pulley, thereby substantially closing the gap between the pulley and the facing plate and preventing the entrance of cold air at this point and adding to the finished appearance of the pulley housing.

Figure 2:
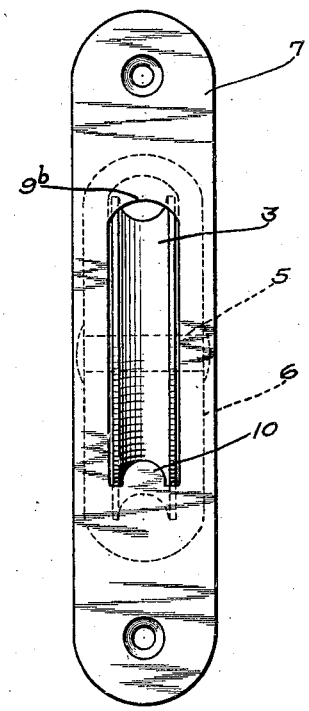
Figure 2 is a front elevation of the pulley showing the tongue provided at the lower end of the slot and projecting into the groove in the pulley.
Figure 3:
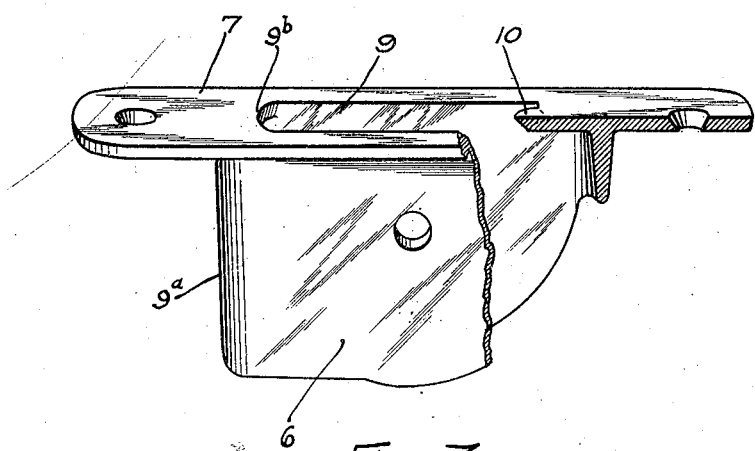
Figure 3 is a perspective view of the housing and facing plate with the pulley removed, partially broken away to show the tongue provided at the lower end of the slot in the facing plate.

By the provision of the tongue 10, in combination with a sash pulley of the type here shown, the opening or gap usually provided between the bottom of the groove 3 of the pulley and the facing plate 7, will be substantially eliminated, the tongue 10 fitting comparatively close to the sides and bottom of the groove, as shown in Figures 1 and 2, thereby closing the gap therebetween sufficiently to prevent entrance of cold air.

The upper portion of the housing 6 has a flanged extension 9ª which overhangs the top of the pulley and has the function of preventing the cord or chain on the pulley from accidentally getting out of place thereon, and at the point where this flange unites with the facing plate 7 we prefer to provide a shoulder or ledge 9ᵇ extending downwardly to a point near the cord or chain to reduce the size of the opening at this point and aid in excluding cold air from passage through the pulley. This shoulder or ledge would, therefore, have substantially the function of the tongue 10 below the pulley, and when a pulley is provided with this ledge and tongue the entrance of cold air into the building through the pulley will be substantially prevented.

Another important feature of this invention resides in the particular construction of the housing, facing plate and tongue 10 which, it will be noted, is integrally formed of a suitable metal such as cast iron. By thus integrally forming the tongue 10 with the facing plate 7, the cost of manufacturing is greatly reduced and a neater pulley housing produced. It has also been found that the housing, facing plate and tongue may be integrally cast of metal in such a manner that very little machine work is required in the manufacture of the article.

We have shown and described this housing for the pulley as made of cast metal but do not confine ourselves to such material as it may be made of metal plates secured together in a suitable way.

We claim as our invention:

A sash pulley comprising a housing having a grooved pulley mounted therein, a facing plate on said housing having a slot through which the pulley projects, a shoulder or ledge on said facing plate at the upper end of said slot having a curved edge facing the groove in said pulley and co-operating with the sash cord to close the gap between the end of said slot and the cord, and a tongue at the lower end of said slot extending upwardly into the pulley groove to close the gap between the periphery of the pulley and said facing plate.

In witness whereof we have hereunto set our hands this 11th day of Aug., 1927.

FRED C. ANDERSEN.
CLARENCE P. BIRD.